April 9, 1935.  J. STOIBER  1,997,321

BRAKE FOR MOTION PICTURE APPARATUS

Filed July 13, 1932

Joseph Stoiber,
Inventor:

By

Attorneys

Patented Apr. 9, 1935

1,997,321

UNITED STATES PATENT OFFICE 1,997,321

BRAKE FOR MOTION PICTURE APPARATUS

Joseph Stoiber, Rochester, N. Y., assignor to Eastman Kodak Company, Rochester, N. Y., a corporation of New York Application July 13, 1932, Serial No. 622,286

12 Claims. (Cl. 188—68)

The present invention relates to a brake for motion picture apparatus, and more particularly to a brake which is only selectively applied to the speed responsive means of a high speed camera.

The various mechanisms within a high speed motion picture camera for photographing "slow motion" pictures are subjected to considerable strain and wear during operation of the camera, but such mechanisms are placed under more severe strain when they are suddenly stopped after rotating at high speeds. Certain mechanisms of the camera may be driven through over-running clutches so that the mechanical inertia to be overcome by the motor release is somewhat reduced but the remainder of the mechanisms are still subjected to terrific strains when the camera is operated at the highest speeds and then suddenly brought to a complete stop.

The primary object of the present invention is the provision of a brake means or brake member within a motion picture camera which is operative only when it is desired to stop the camera and only when the camera is operating above normal speeds.

Another object of the invention is the provision of a brake member which cooperates with the camera release to prevent engagement of the release and stopping of the camera until the rotative speed of the camera has been reduced to or below a predetermined value.

Other objects of the invention will be suggested to those skilled in the art as the description of my invention is developed hereinafter.

The several objects of the invention are attained by the provision of a brake member which is adapted frictionally to engage a friction surface assuming positions corresponding to the rotative speeds of a speed responsive means, said brake member being adapted to engage the friction surface only in positions corresponding to speeds above a predetermined value and only to retard the speed responsive means. The brake member cooperates with a stop means for stopping the camera upon engagement and in such a manner that said stop means cannot become engaged during operation of the camera above a predetermined speed.

Reference is hereby made to the accompanying drawing in the several figures of which similar elements are designated by similar reference numerals and in which.

Figure 1:
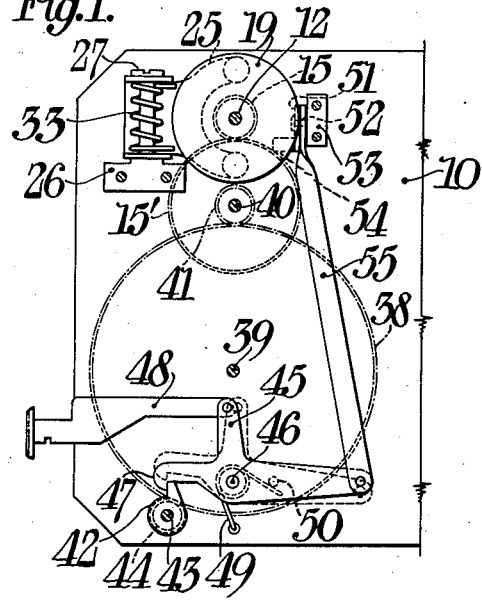
Fig. 1 is a vertical, longitudinal cross-section of the camera mechanism according to the invention primarily illustrating a side elevation of the camera parts and taken on the line 1—1 of Fig. 2
Figure 2:
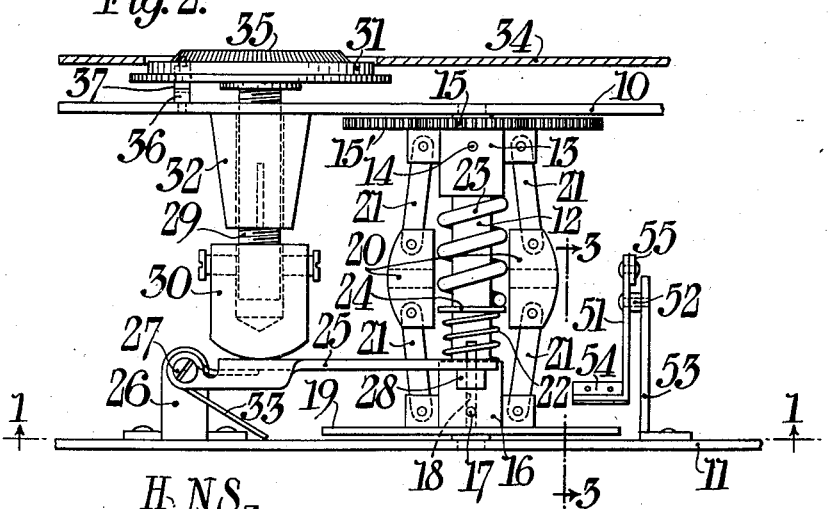
Fig. 2 is a fragmentary, plan view of the camera according to the invention showing the governor, adjustable means for setting the governor speed and the brake means for engaging the friction surface of the governor.

In the illustrated embodiment of the invention, the camera mechanisms are all mounted on or between the mechanism plates 10 and 11. A governor shaft 12 is journaled at each end in mechanism plates 10 and 11. A collar 13 is located on governor shaft 12 and is fastened thereto by a pin 14. A gear 15 is also mounted to turn with governor shaft 12 and meshes with a gear 15' which constitutes an element in a gear train to be described later. A second collar 16 is located upon the other end of governor shaft 12 to rotate therewith but axially slidable thereon, a pin 17 in collar 16 engaging a slot 18 in governor shaft 12 for this purpose. A governor disk 19 is attached to collar 16 to turn with shaft 12 but also axially slidable thereon. A plurality of weight members 20 are pivotally linked between collar 13 and collar 16 by means of a plurality of arms 21.

A spring means for normally moving collars 13 and 16 away from each other, encircles governor shaft 12 and is preferably composed of a light coil spring 22 and a heavy coil spring 23 separated by a washer 24, all of which encircle governor shaft 12. The spring means employed may be of any known form or may be either of the forms disclosed in my copending application Serial No. 620,189, filed June 30, 1932, for a centrifugal governor for a motion picture camera, in which application the advantages and performance of such a spring means are explained.

A brake means of known form and function is provided for the purpose of determining the governor speed and cooperates with an adjustable means for varying the setting of said brake means. A brake arm 25 is pivotally mounted on a bracket 26 on mechanism plate 11 by means of bolt 27. A brake shoe 28 composed of leather, cork or other suitable friction material, is fastened to one end of brake arm 25 and is adapted frictionally to engage one surface of governor disk 19. The aforementioned adjustable means comprises a threaded stem 29 which has a head piece 30 on one end and a dial 31 on the other end, and which engages a split nut 32 on mechanism plate 10. A coil spring 33 maintains brake arm 25 against head piece 30 for any setting of the adjusting means. The dial 31 extends into and is visible through an aperture in the camera casing 34, being provided with a knurled annular ridge 35 to facilitate manual rotation of dial 31. A lug 36 is located on mechanism plate 10 and a projection 37 is positioned upon dial 31 so that more than a single rotation of dial 31 is not possible. The outer surfaces of dial 31 and camera casing 34 may be provided with suitable marks or graduations to indicate the setting of the adjusting means and the corresponding speed of the governor or camera. The driving power for the camera may be an electric motor or a spring motor, the latter being preferred. Such a prime mover is not shown in the drawing but drives a large pinion gear 38 mounted upon a shaft 39 which is rotatably mounted between mechanism plates 10 and 11. Another shaft 40 supports a small gear 41 meshing with large pinion gear 38 and also supports gear 15' which meshes with and drives gear 15 on governor shaft 12.

A stop means which is adapted upon engagement to stop the camera mechanism will next be described. A toothed means, such as a single toothed gear 42, is attached to shaft 43 which also carries a small gear 44 in mesh with the large pinion gear 38. The toothed means comprises one element of the stop means, while the other element of the stop means is constituted primarily by a pawl 45. Pawl 45 is rotatably mounted on a shaft 46 and has a tooth 47 which is adapted to engage the single toothed gear 42. A finger piece 48 is pivotally connected to pawl 45 and extends to the exterior of the camera for movement by the operator of the camera. A coil spring 49 encircles shaft 46 and has one end attached to mechanism plate 10 and the other end engaging a pin 50 on pawl 45 so that pawl 45 is normally held in engagement with the single toothed gear 42.

The camera mechanism thus far described, except the spring means in the governor, is of conventional form and design. The friction surface of the governor assumes various positions corresponding to the setting of the adjusting means and to the speed of rotation of the governor or speed means. While the setting of brake arm 25, the strength of the spring means between collars 13 and 16, and the centrifugal forces created in the weight members 20 upon rotation of the shaft 12 all contribute to the position assumed by governor disk 19, it is deemed accurate to ascribe this location of the friction surface to the speed responsive means or the governor.

The brake means which constitutes the essence of the present invention will now be described. Such a brake means includes a brake member which is located adjacent the friction surface of the speed responsive means and which is actuated by one element of the stop means. Specifically the brake arm 51 is pivotally mounted upon a pin 52 supported by a bracket 53 which is attached to mechanism plate 11. Brake arm 51 is intermediately pivoted to pin 52 and is provided on one end with a brake shoe 54 made of suitable friction material and at the other end is pivotally connected to a link 55. The link 55 is also pivotally connected to pawl 45 which is in the form of a bell crank. The brake arm 51 is operated by the pawl member of the stop means, and in turn controls the operation of the pawl member in a manner more fully explained hereinafter.

Figure 3:
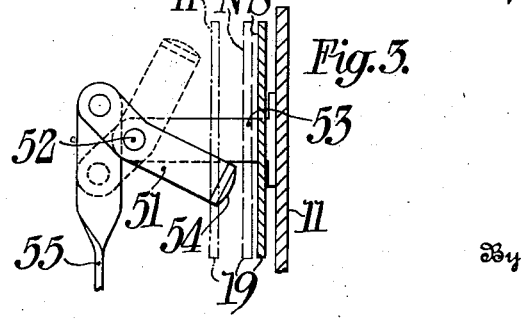
Fig. 3 is a fragmentary, transverse, vertical cross-section through the camera illustrating the cooperation of the brake member with the friction surface of the governor and taken on the line 3—3 of Fig. 2.

It is conventional and satisfactory to stop abruptly a camera mechanism which is only operating at normal speed or 16 frames per second. As before stated, however, the various parts of the camera are severely strained when halted abruptly after operating at speeds greater than normal speed, such as 32, 48 and 64 frames per second. Referring to Fig. 3, the position assumed by the friction surface of governor disk 19 when the camera mechanism is stationary is illustrated in full lines and by the letter S. The position assumed by the friction surface of governor disk 19 during operation of the camera at normal speed is indicated by the dashed lines and the letter N. The position of the friction surface of governor disk 19 during high speed operation of the camera is indicated in Fig. 3 by the dash-dot lines and the letter H. It will be noted that brake arm 51 in its pivotal movement about pin 52 will not engage the friction surface of governor disk 19 when in the positions S, N, or intermediate positions. The movement of brake arm 51 about pin 52 takes place when the pawl 45 of the stop means is moved to release the single toothed gear 42. In other words, when finger piece 48 is pressed inwardly, pawl 45 is rotated about shaft 46 and link 55 swings brake arm 51 into the position indicated by dotted lines in Fig. 3. Even though the speed responsive means or governor is set at high speeds, the brake shoe 54 on brake arm 51 will not engage the friction surface of disk 19 at this time because the speed responsive means will not have had sufficient opportunity to attain the speed corresponding to the setting and the friction surface will not have assumed its corresponding position.

Assuming now that the camera is operating at a speed above the predetermined value or normal speed of 16 frames per second, upon release of finger piece 48 the brake arm 51 will be permitted to engage the friction surface to retard the rotative speed of the speed responsive means and this frictional engagement will continue until the speed responsive means has been retarded to normal speed and the friction surface or governor disk 19 has been moved to the position N. During the frictional engagement between brake arm 51 and the friction surface of the speed responsive means, the pawl 45 of the stop means is held out of engagement with the single toothed gear and in the position indicated by dotted lines in Fig. 1 so that the stop means cannot become engaged to stop the camera mechanism until it has been retarded to normal speed. The coil spring 49 performs a dual function at such a time; first it urges the brake shoe 54 on brake arm 51 into frictional engagement with the friction surface of the speed responsive means and it also urges pawl 45 to rotate about shaft 46 tending to cause tooth 47 on pawl 45 to engage the single toothed gear 42.

Since many modifications of the present invention are possible without departing from the spirit or scope of the invention, the present disclosure is to be construed in an illustrative and not in a limiting sense.

Having now particularly described my invention what I desire to secure by Letters Patent of the United States and what I claim is:

1. In a device of the character described, the combination with a speed responsive means including a surface movable to various positions corresponding to the rotative speed of said means, and a stop means adapted upon engagement to stop said device, of a brake member movable by said stop means into and out of engaging position with respect to said surface and arranged to leave said engaging position before engagement of said stop means.

2. In a device of the character described, the combination with a speed responsive means including a surface movable to various positions corresponding to the rotative speed of said means, and a stop means adapted upon engagement to stop said device, of a brake member movable by said stop means into and out of engaging position with respect to said surface and arranged to engage said surface only in those positions of said surface which correspond to speeds of said speed responsive means in excess of a predetermined speed.

3. In a device of the character described, the combination with a speed responsive means including a surface movable to various positions corresponding to the rotative speed of said means, and a stop means adapted upon engagement to stop said device, of a brake member movable by said stop means into and out of engaging position with respect to said surface and arranged to engage said surface only in those positions of said surface which correspond to speeds of said speed responsive means in excess of a predetermined speed and to prevent engagement of the stop means during such engagement with said surface.

4. In a device of the character described, the combination with a centrifugal governor provided with a friction surface adapted to assume a position corresponding to the rotative speed of said governor, and a stop means adapted upon engagement to stop said device, of a brake means moved by said stop means and for selectively engaging the friction surface of said governor.

5. In a device of the character described, the combination with a centrifugal governor provided with a friction surface adapted to assume a position corresponding to the rotative speed of said governor, and a stop means adapted upon engagement to stop said device, of a brake member actuated by said stop means and adapted frictionally to engage said friction surface only in a position of said surface corresponding to rotation of said governor above a predetermined speed.

6. In a device of the character described, the combination with a centrifugal governor including a disk axially movable and adapted to assume a position corresponding to the speed of rotation of said governor, and a stop means adapted upon engagement to stop said device, of a brake member moved by said stop means and adapted frictionally to engage said disk only in a position occupied by said disk corresponding to rotation of said governor above a predetermined speed.

7. In a device of the character described, the combination with a centrifugal governor provided with a friction surface adapted to assume a position corresponding to the rotative speed of said governor and a stop means adapted upon engagement to stop said device, of a brake member associated with said stop means, adapted frictionally to engage said surface and to prevent engagement of said stop means only in those positions of the friction surface corresponding to high governor speeds.

8. In a device of the character described, the combination with a centrifugal governor provided with a friction surface adapted to assume a position corresponding to the rotative speed of said governor, and a stop means adapted upon engagement to stop said device, of a brake member associated with said stop means and adapted frictionally to engage said friction surface in positions of said surface corresponding to governor speeds above a predetermined speed, said friction surface also preventing engagement of said stop means during governor speeds above said predetermined speed.

9. In a device of the character described, the combination with a centrifugal governor provided with a surface adapted to assume a position corresponding to the rotative speed of said governor, and a stop means adapted upon engagement to stop said device, of a brake member moved by said stop means and adapted frictionally to engage said surface only in those positions of said surface corresponding to rotation of said governor above a predetermined speed, and a resilient means normally moving said stop means into engagement and normally moving said brake member into position for engagement with said surface.

10. In a device of the character described, the combination with a friction disk, a centrifugal governor controlling the position of said disk according to the rotative speed of said governor, and a stop means adapted upon engagement to stop said device, of a brake member swung in an arcuate path by said stop means and adapted frictionally to engage said friction disk just prior to the engagement of said stop means if said governor is rotating at a speed in excess of a predetermined value.

11. In a device of the character described, the combination with a friction disk, a centrifugal governor controlling the position of said disk according to the rotative speed of said governor, a toothed means geared to said governor and a pawl adapted to engage said toothed means and to stop said device, of a brake member linked to said pawl and adapted frictionally to engage said disk if said governor is rotating at a speed in excess of a predetermined value, said pawl being prevented from engaging said toothed means while said brake member is in frictional engagement with said disk.

12. In a device of the character described, the combination with a friction disk, a centrifugal governor controlling the position of said disk according to the rotative speed of said governor, a toothed means geared to said governor and a pawl adapted to engage said toothed means and to stop said device, of a brake member linked to said pawl and adapted frictionally to engage said disk if said governor is rotating at a speed in excess of a predetermined value, said pawl being prevented from engaging said toothed means while said brake member is in frictional engagement with said disk, and a spring normally urging said pawl into engagement with said toothed means and adapted normally to move said brake member into frictional engagement with said disk if the governor is rotating at a speed in excess of said predetermined value.

JOSEPH STOIBER.